United States Patent
Luo

(10) Patent No.: US 12,253,772 B2
(45) Date of Patent: Mar. 18, 2025

(54) DISPLAY PANEL AND DISPLAY DEVICE

(71) Applicant: Wuhan China Star Optoelectronics Technology Co., Ltd., Wuhan (CN)

(72) Inventor: Chengzhi Luo, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/924,412

(22) PCT Filed: Nov. 3, 2022

(86) PCT No.: PCT/CN2022/129583
§ 371 (c)(1),
(2) Date: Nov. 10, 2022

(87) PCT Pub. No.: WO2024/040746
PCT Pub. Date: Feb. 29, 2024

(65) Prior Publication Data
US 2024/0219784 A1 Jul. 4, 2024

(30) Foreign Application Priority Data
Aug. 26, 2022 (CN) .......................... 202211037704.7

(51) Int. Cl.
*G02F 1/1362* (2006.01)
*G02F 1/1333* (2006.01)
*G02F 1/1335* (2006.01)

(52) U.S. Cl.
CPC .. *G02F 1/136209* (2013.01); *G02F 1/133302* (2021.01); *G02F 1/133507* (2021.01)

(58) Field of Classification Search
CPC ......... G02F 1/136209; G02F 1/133507; G02F 1/133526; G02F 1/133611; G02F 1/133606; G02F 1/133607; H10K 50/858
See application file for complete search history.

(56) References Cited

U.S. PATENT DOCUMENTS

2014/0339509 A1 11/2014 Choi et al.
2024/0069381 A1* 2/2024 Ai .................... G02F 1/133553

FOREIGN PATENT DOCUMENTS

| CN | 111834544 A | 10/2020 |
| CN | 114267704 A | 4/2022 |
| CN | 216793720 U | 6/2022 |
| JP | 2006259569 A | 9/2006 |

(Continued)

OTHER PUBLICATIONS

International Search Report in International application No. PCT/CN2022/129583, mailed on May 9, 2023.

(Continued)

*Primary Examiner* — Jia X Pan
(74) *Attorney, Agent, or Firm* — Nathan & Associates; Menachem Nathan

(57) ABSTRACT

A display panel and a display device are provided. The display panel includes a non-opening region and opening regions. The display panel includes a substrate. The substrate is located on a side of the display panel away from a light-exiting surface. The substrate includes a first base layer, a second base layer, and a third base layer. A first interface is formed between the second base layer and the first base layer. A second interface is formed between the third base layer and the second base layer.

18 Claims, 8 Drawing Sheets

(56) References Cited

FOREIGN PATENT DOCUMENTS

| JP | 2008233729 A | 10/2008 |
| JP | 2013114772 A | 6/2013 |
| JP | 2016048286 A | 4/2016 |
| JP | 2019132880 A | 8/2019 |

OTHER PUBLICATIONS

Written Opinion of the International Search Authority in International application No. PCT/CN2022/129583, mailed on May 9, 2023.
Chinese Office Action issued in corresponding Chinese Patent Application No. 202211037704.7 dated Jan. 16, 2025, pp. 1-7.

* cited by examiner

DISPLAY PANEL AND DISPLAY DEVICE

BACKGROUND OF INVENTION

Field of Invention

The present invention relates to a field of display technology, and particularly to a display panel and a display device.

Description of Prior Art

In recent years, technology of thin film transistor liquid crystal displays (TFT-LCDs) is continuously developed to a direction of low power consumption, high brightness, and improving light utilization rate. Wherein, improving light transmittance performance can significantly improve brightness of the TFT-LCDs and can reduce power consumption, which is a difficulty that all panel manufacturers in the world are overcoming.

The light transmittance performance of the TFT-LCDs refer to a ratio of light intensity before and after backlight source passing through display panels. Under general conditions, the light transmittance performance of the TFT-LCDs only range from 3% to 10%, which means that more than 90% of the light cannot be used. Regarding the non-opening regions of the display panels, light incident from a direction of a backlight source can be absorbed by an opaque film material, resulting in loss of light efficiency. Therefore, it is necessary to improve the defect.

SUMMARY OF INVENTION

Embodiments of the present invention provide a display panel, which is configured to solve the technical problem that light incident in the non-opening regions of the display panels of the prior art is absorbed by the opaque film materials.

One embodiment of the present invention provides a display panel, including a non-opening region and a plurality of opening regions. The non-opening region is located between adjacent opening regions. The display panel comprises a substrate. The substrate is located on a side of the display panel away from a light-exiting surface. The substrate includes a first base layer, a second base layer, and a third base layer. The second base layer is located on the first base layer. A first interface is formed between the second base layer and the first base layer, and a refractive index of the second base layer is greater than a refractive index of the first base layer. The third base layer is located on the second base layer. A second interface is formed between the third base layer and the second base layer, and a refractive index of the third base layer is less than the refractive index of the second base layer. Wherein, at least one of the first interface or the second interface forms a first concave surface in the non-opening region, and a concave direction of the first concave surface is toward a side with a larger refractive index in two sides of the first concave surface.

One embodiment of the present invention further provides a display device, including a backlight module and a display panel. The display panel is located on a light-exiting side of the backlight module. The display panel includes a non-opening region and a plurality of opening regions. The non-opening region is located between adjacent opening regions. The display panel comprises a substrate. The substrate is located on a side of the display panel away from a light-exiting surface. The substrate includes a first base layer, a second base layer, and a third base layer. The second base layer is located on the first base layer. A first interface is formed between the second base layer and the first base layer, and a refractive index of the second base layer is greater than a refractive index of the first base layer. The third base layer is located on the second base layer. A second interface is formed between the third base layer and the second base layer, and a refractive index of the third base layer is less than the refractive index of the second base layer. Wherein, at least one of the first interface or the second interface forms a first concave surface in the non-opening region, and a concave direction of the first concave surface is toward a side with a larger refractive index in two sides of the first concave surface.

Embodiments of the present invention provides a display panel, including a non-opening region and a plurality of opening regions. The non-opening region is located between adjacent opening regions. The display panel includes a substrate. The substrate is located on a side of the display panel away from a light-exiting surface. The substrate includes a first base layer, a second base layer, and a third base layer. A first interface is formed between the second base layer and the first base layer. A refractive index of the second base layer is greater than a refractive index of the first base layer. A second interface is formed between the third base layer and the second base layer. A refractive index of the third base layer is less than the refractive index of the second base layer. In the present invention, by forming at least one of the first interface or the second interface form a first concave surface in the non-opening region, and a concave direction of the first concave surface is toward a side with a larger refractive index in two sides of the first concave surface, so that the first concave surface can refract a light incident in the non-opening region from the side away from the light-emitting surface of the display panel into the opening regions. By changing a propagation direction of the light, the light is made to enter the opening regions and emit, thereby improving light efficiency of the display panel and improving optical performance of the display panel.

DESCRIPTION OF DRAWINGS

To more clearly illustrate the technical solutions of the embodiments of the present invention, the required accompanying figures for description of embodiments is described in brief as follow.

DETAILED DESCRIPTION OF EMBODIMENTS

Figure 1:
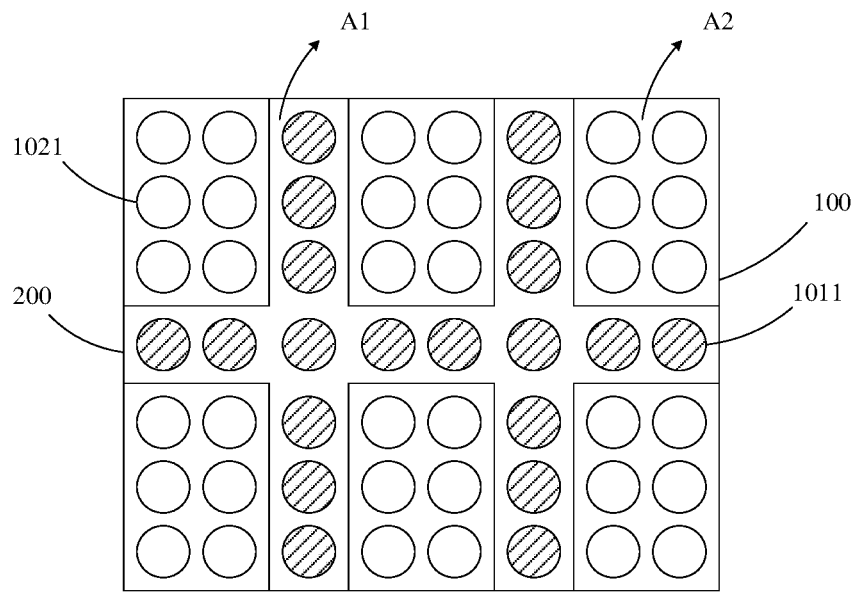
FIG. 1 is a top view of a display panel provided by one embodiment of the present invention.

The technical solutions in the embodiments of the present invention are clearly and completely described in the following with reference to the accompanying drawings in the embodiments of the present invention. In the drawings, for clarity and ease of understanding and description, the dimensions and thicknesses of components shown in the drawings are according to scales.

It should be noted that, regarding non-opening regions of a display panel, light incident from a direction of a backlight can be absorbed by an opaque film material, resulting in loss of light efficiency. Embodiments of the present invention can solve the aforesaid defect.

Figure 2:
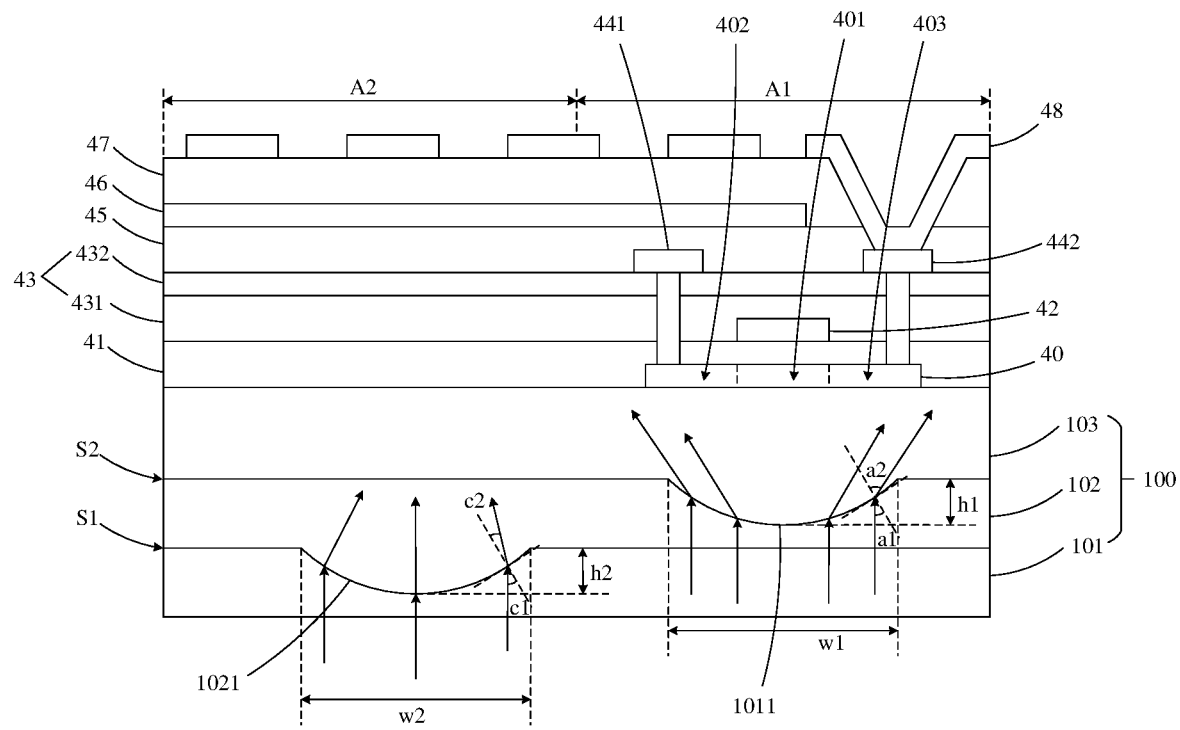
FIG. 2 is a first structural schematic diagram of the display panel provided by one embodiment of the present invention.

As illustrated in FIG. 1 and FIG. 2, which are respectively a top view of a display panel and a first structural schematic diagram of the display panel provided by embodiments of the present application. The display panel includes a non-opening region A1 and a plurality of opening regions A2. The non-opening region A1 is located between adjacent opening regions A2. The display panel includes a substrate 100. The substrate 100 is located on a side of the display panel away from a light-exiting surface. The substrate 100 includes a first base layer 101, a second base layer 102, and a third base layer 103. The second base layer 102 is located on the first base layer 101. A first interface S1 is formed between the second base layer 102 and the first base layer 101, and a refractive index of the second base layer 102 is greater than a refractive index of the first base layer 101. The third base layer 103 is located on the second base layer 102. A second interface S2 is formed between the third base layer 103 and the second base layer 102, and a refractive index of the third base layer 103 is less than the refractive index of the second base layer 102. Wherein, at least one of the first interface S1 or the second interface S2 forms a first concave surface 1011 in the non-opening region A1, and a concave direction of the first concave surface 1011 is toward a side with a larger refractive index in two sides of the first concave surface 1011.

Figure 7:
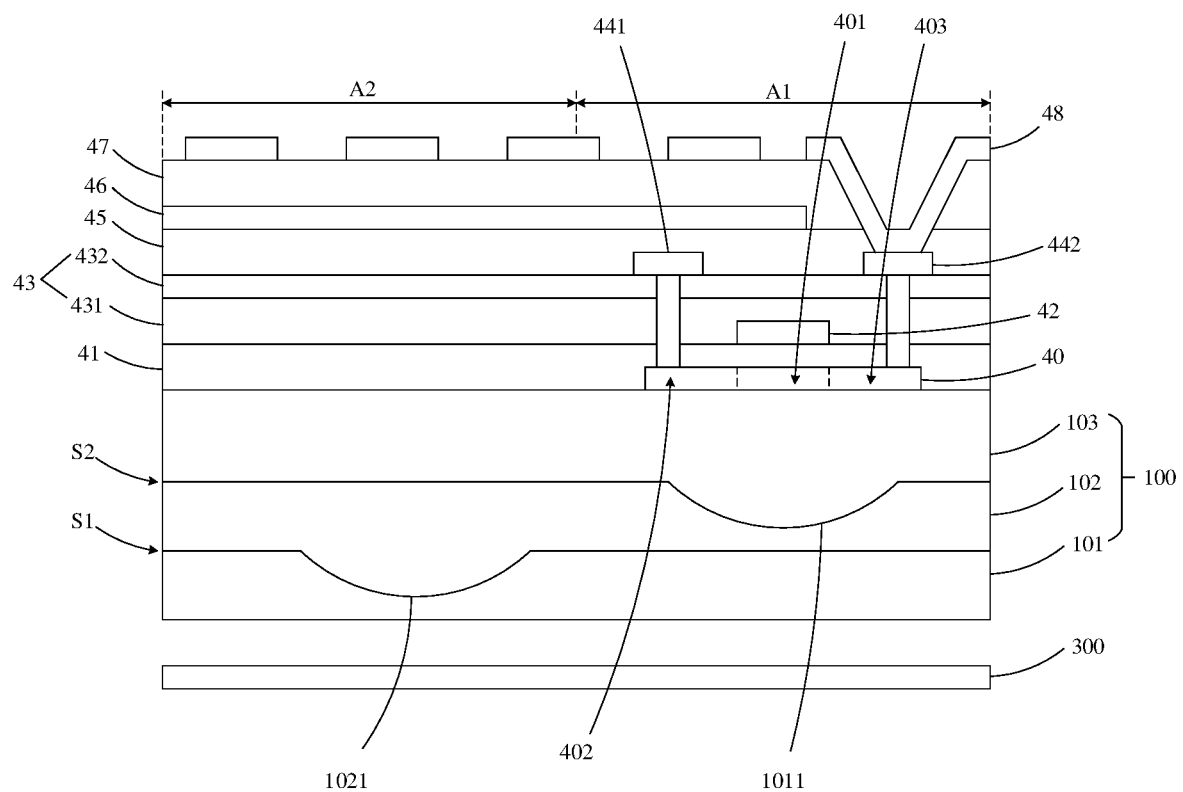
FIG. 7 is a schematic diagram of a basic structure of a display device provided by one embodiment of the present invention.

It should be noted that the substrate 100 being located on the side of the display panel away from the light-exiting surface refers to: the substrate 100 is disposed close to the backlight module 300 (as illustrated in FIG. 7). The light emitted from the backlight module 300 is firstly refracted by the first concave surface 1011 corresponding to the incident light in the non-opening region A1, and then exits from the opening region A2 after a propagation direction being changed, thereby improving the light efficiency of the display panel and improving the utilization rate of the light. As illustrated in FIG. 1, one embodiment of the present invention provides that the plurality of first concave surfaces 1011 are evenly distributed in the entire non-opening region A1, which can greatly improve the light utilization rate.

Specifically, in FIG. 2, only the first concave surface 1011 being formed in the non-opening region A1 of the second interface S2 is taken an example for description. Because the refractive index of the third base layer 103 is less than the refractive index of the second base layer 102, the concave direction of the first concave surface 1011 is toward the second base layer 102. According to the formula n1 Sin θ1=n2 Sin θ2, it can be understood that an emitting angle increases when the light enters a layer with a low refractive index from a layer with a high refractive index. Therefore, when the light enters the third substrate layer 103 from the second substrate layer 102, an incident angle a1 is smaller than an emitting angle a2, i.e., the light diverges in the first concave surface 1011. In this way, the light of the non-opening region A1 can be refracted to the opening region A2, thereby improving the light efficiency of the display panel.

In one embodiment, at least one of the first interface S1 or the second interface S2 forms a second concave surface 1021 in the opening regions A2, and a concave direction of the second concave surface 1021 is toward a side with a smaller refractive index in two sides of the second concave surface 1021.

Specifically, in FIG. 2, only the second concave surface 1021 being formed in the opening region A2 of the first interface S1 is taken an example for description. Because the refractive index of the first base layer 101 is less than the refractive index of the second base layer 102, the concave direction of the second concave surface 1021 is toward the first base layer 101. According to the formula n1 Sin θ1=n2 Sin θ2, it can be understood that an emitting angle decreases when the light enters a layer with a high refractive index from a layer with a low refractive index. Therefore, when the light enters the second substrate layer 102 from the first substrate layer 101, an incident angle C1 is greater than an emitting angle C2, i.e., the light converges in the second concave surface 1021, so that the light efficiency and brightness of the opening regions A2 can be improved. If combining the first concave surface 1011 and the second concave surface 1021, all the light of the display panel can be utilized, which can improve light efficiency of the entire display panel.

In one embodiment, sectional shapes of the first concave surface 1011 and the second concave surface 1021 are circular arc or trapezoidal in a direction of a light-exiting side of the display panel. In this embodiment, the first concave surface 1011 is a three-dimensional micro-prism structure, which has a function of diffusing light; and the second concave surface 1021 is a three-dimensional micro-prism structure, which has a function of converging light.

In one embodiment, in the direction of the light-exiting side of the display panel, a height h1 of the first concave surface 1011 and a height h2 of the second concave surface 1021 are greater than or equal to 0.2 μm, and less than or equal to 2 μm; and in a direction perpendicular to the light-exiting side of the display panel, a maximum width w1 of the first concave surface 1011 and a maximum width w2 of the second concave surface are greater than or equal to 5 μm, and less than or equal to 20 μm.

In one embodiment, the display panel includes an active layer 40 located in the non-opening region A1, the active layer 40 is located on the substrate 100, and the active layer 40 includes a channel region 401, and a source contact region 402 and a drain contact region 403 respectively located on two sides of the channel region 401. Wherein, an orthogonal projection of the channel region 401 on the substrate 100 is located in the first concave surface 1011.

It can be understood that light-shielding layers are generally disposed in conventional display panels to prevent light from irradiating channel regions of active layers. As the first concave surface 1011 in this embodiment can diffuse the light from the non-opening region A1 into the opening regions A2, and by making the orthographic projection of the channel region 401 on the substrate 100 to be located in the first concave surface 1011 in this embodiment, so irradiation of the light on the channel region 401 of the active layer 40 can be prevented. Therefore, adopting the solution of this embodiment can also have an effect of omitting the light-shielding layer.

In one embodiment, the display panel further includes a gate insulation layer 41, a gate electrode layer 42, an interlayer insulation layer 43, a source electrode layer 441, a drain electrode layer 442, a planarization layer 45, a bottom electrode 46, a passivation layer 47, and a top electrode 48. The gate insulation layer 41 is located on the active layer 40. The gate electrode layer 42 is located on the gate insulation layer 41. The interlayer insulation layer 43 is located on the gate electrode layer 42. The interlayer insulation layer 43 includes a first insulation layer 431 and a second insulation layer 432. The source electrode 441 and the drain electrode 442 are located on the interlayer insulation layer 43. The source electrode layer 441 is electrically connected to the source contact region 402 through a via hole. The drain electrode layer 442 is electrically connected to the drain contact region 403 through a via hole. The planarization layer 45 is located on the source electrode layer 441 and the drain electrode layer 442. The bottom electrode 46 is located on the planarization layer 45. The passivation layer 47 is located on the bottom electrode 46. The top electrode 48 is located on the passivation layer 47. The top electrode 48 is electrically connected to the drain electrode layer 442 through a via hole.

Figure 3:
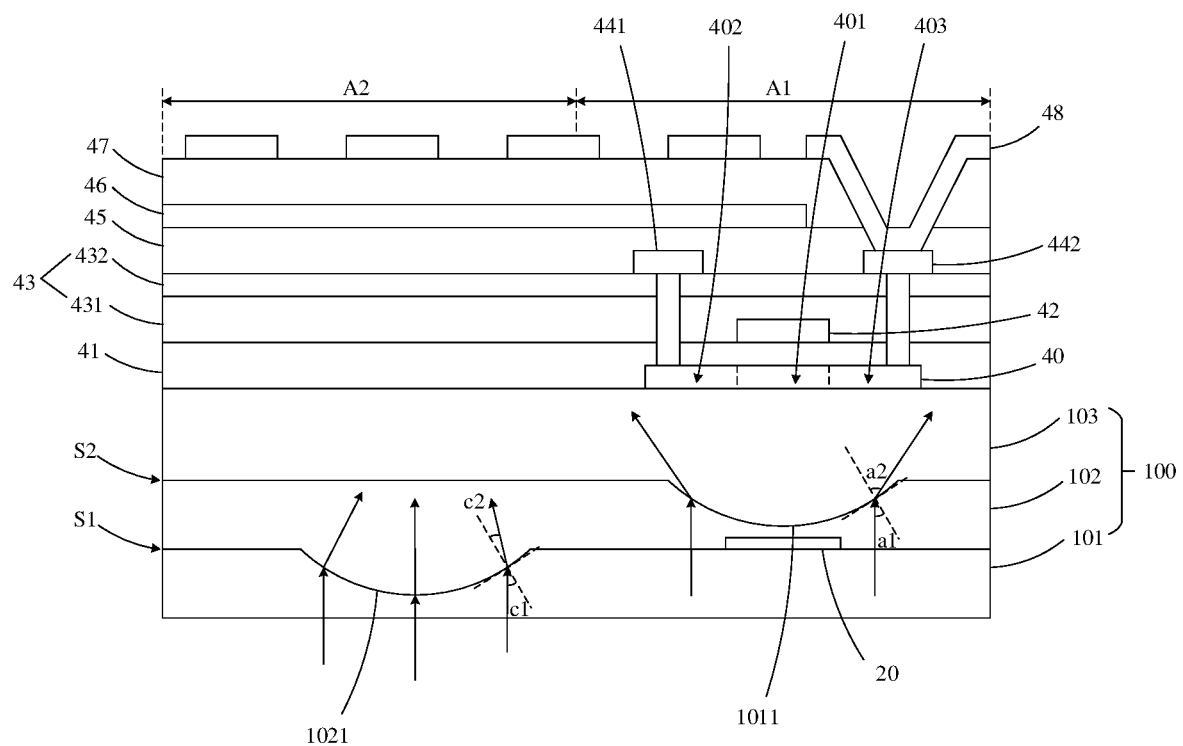
FIG. 3 is a second structural schematic diagram of the display panel provided by one embodiment of the present invention.

Next, please refer to FIG. 3, which is a second structural schematic diagram of the display panel provided by one embodiment of the present invention. The difference from the first structure in FIG. 2 is that in this embodiment, the display panel includes a light-shielding layer 20. The light-shielding layer 20 is located between the first base layer 101 and the active layer 40. Wherein, an orthogonal projection of the channel region 401 on the light-shielding layer 20 is located on the light-shielding layer 20, and an orthogonal projection of the light-shielding layer 20 on the substrate 100 is located in the first concave surface 1011.

It should be noted that as the light incident in the first concave surface 1011 cannot all be steered clear of the channel region 401, the light-shielding layer 20 is stilled disposed at the position corresponding to the channel region 401 in this embodiment, which ensures the light cannot enter the channel region 401, so that the performance of the active layer 40 is more stable. Additionally, the light in the first concave surface 1011 not being shielded by the light-shielding layer 20 can still be refracted and then enter the opening regions A2, so a part of the light effect can also be improved.

In one embodiment, the first base layer 101 is a glass substrate, the second base layer 102 is a silicon nitride layer, and the third base layer 103 is a silicon oxide layer. Wherein, the active layer 40 is located on a surface of a side of the silicon oxide layer away from the silicon nitride layer, and the light-shielding layer 20 is located on a surface of the glass substrate close to the active layer 40.

It can be understood that, in this embodiment, the active layer 40 can be directly manufactured on the silicon oxide layer, i.e., the silicon nitride layer and the silicon oxide layer can be multiplexed as a buffer layer and a barrier layer of the display panel. Therefore, no additional thickness of the display panel is added. In other embodiments, other insulation materials with a high transmittance rate can also be selected and used in the first base layer 101, the second base layer 102, and the third base layer 103, so as to increase light transmittance rate and to improve light effect.

In one embodiment, a thickness of the silicon oxide layer is greater than a thickness of the silicon nitride in a direction of a light-exiting side of the display panel.

Figure 4:
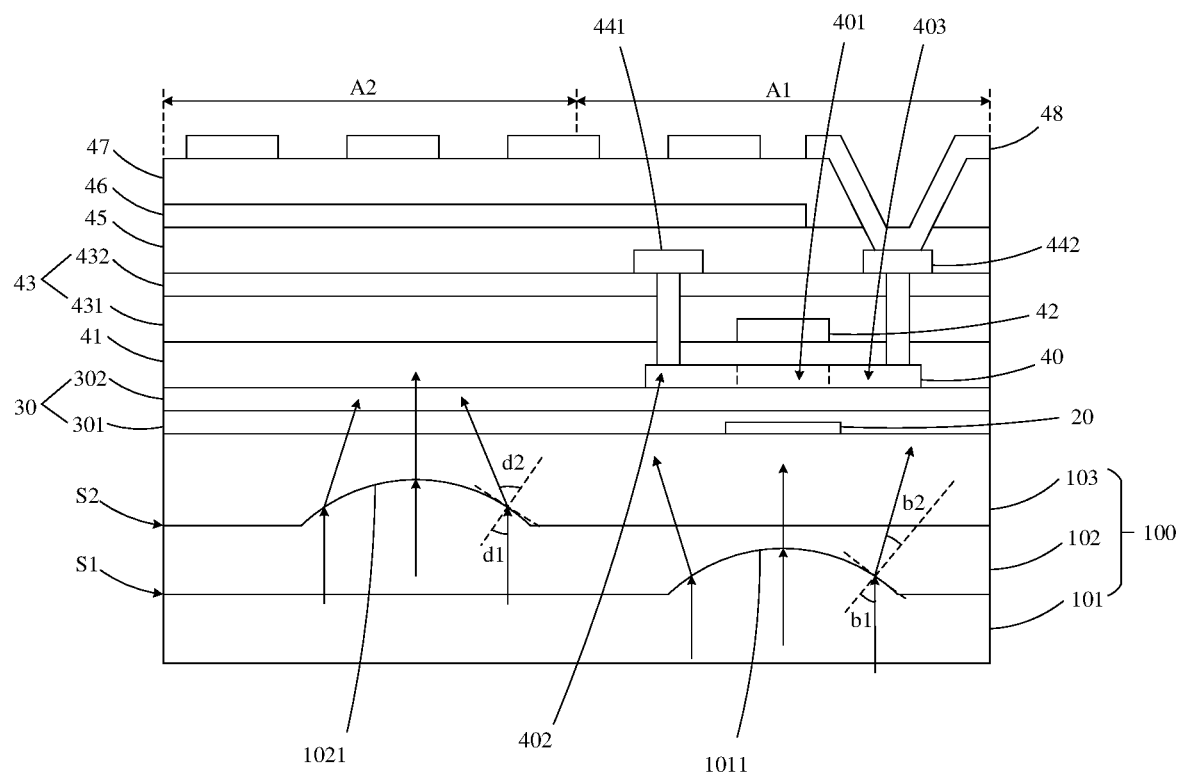
FIG. 4 is a third structural schematic diagram of the display panel provided by one embodiment of the present invention.

It can be understood that, in this embodiment, by making the thickness of the silicon oxide layer to be larger than the thickness of the silicon nitride layer, the light is refracted through the first concave surface 1011 and then passes through the silicon oxide layer with a larger thickness. Therefore, before the light reaches other layers on the silicon oxide layer, there is enough distance to change the propagation direction, so that more light can be refracted into the opening regions A2, making the light efficiency to be higher Next, please refer to FIG. 4, which is a third structural schematic diagram of the display panel provided by one embodiment of the present invention. In FIG. 4, only the first concave surface 1011 being formed in the non-opening region A1 of the first interface S1 is taken an example for description. Because the refractive index of the first base layer 101 is less than the refractive index of the second base layer 102, the concave direction of the first concave surface 1011 is toward the second base layer 102. In FIG. 4, only the second concave surface 1021 being formed in the opening regions A2 of the second interface S2 is taken an example for description. Because the refractive index of the third base layer 103 is less than the refractive index of the second base layer 102, the concave direction of the second concave surface 1021 is toward the third base layer 103.

It can be understood that, in this embodiment, as the refractive index of the first base layer 101 is less than the refractive index of the second base layer 102, according to the formula n1 Sin θ1=n2 Sin θ2, it can be understood that an emitting angle decreases when the light enters a layer with a high refractive index from a layer with a low refractive index. Therefore, when the light enters the second substrate layer 102 from the first substrate layer 101, an incident angle b1 is greater than an emitting angle b2, i.e., the light diverges in the first concave surface 1011. In this way, the light of the non-opening region A1 can be refracted to the opening regions A2, thereby improving the light efficiency of the display panel.

It can be understood that, in this embodiment, as the refractive index of the third base layer 103 is less than the refractive index of the second base layer 102, according to the formula n1 Sin θ1=n2 Sin θ2, it can be understood that an emitting angle increases when the light enters a layer with a low refractive index from a layer with a high refractive index. Therefore, when the light enters the third substrate layer 103 from the second substrate layer 102, an incident angle d1 is less than an emitting angle d2, i.e., the light converges in the second concave surface 1021, so that the light efficiency and brightness of the opening regions A2 can be improved. If combining the first concave surface 1011 and the second concave surface 1021, all the light of the display panel can be utilized, which can improve light efficiency of the entire display panel.

In one embodiment, the first base layer 101 is a silicon oxide layer, the second base layer 102 is a silicon nitride layer, and the third base layer 103 is a glass substrate. Wherein, a barrier layer 30 is disposed between the glass substrate and the active layer 40, and the light-shielding layer 20 is located on a surface of a side of the glass substrate close to the active layer 40.

It can be understood that as the glass substrate is located on the silicon nitride layer, and the light is diverged by the first concave surface 1011 and then passes through the glass substrate with a large thickness, so that before the light reaches other layers on the glass substrate, there is enough distance to change the propagation direction, thereby making more light to be refracted into the opening regions A2 and having higher light efficiency. In addition, manufacturing the silicon oxide layer and the silicon nitride layer on a back surface of the glass substrate can also prevent influence of surface unevenness of the silicon oxide layer and the silicon nitride layer on electrical properties of a thin film transistor on a front surface of the glass substrate.

In this embodiment, the barrier layer 30 includes a first barrier layer 301 and a second barrier layer 302.

Please continue referring to FIG. 1. In one embodiment, the display panel includes a black matrix layer 200, the black matrix layer 200 is located on the substrate 100, and the black matrix layer 200 completely overlaps with the non-opening region A1.

It should be noted that the black matrix layer 200 can be located in the array substrate and can also located in a substrate opposite to the array substrate. Because the black matrix layer 200 completely overlaps with the non-opening region A1, the first concave surface 1011 is located in an region shielded by the black matrix layer 200, and the second concave surface 1021 is disposed in the opening region A2 not shielded by the black matrix layer 200.

Figure 5:
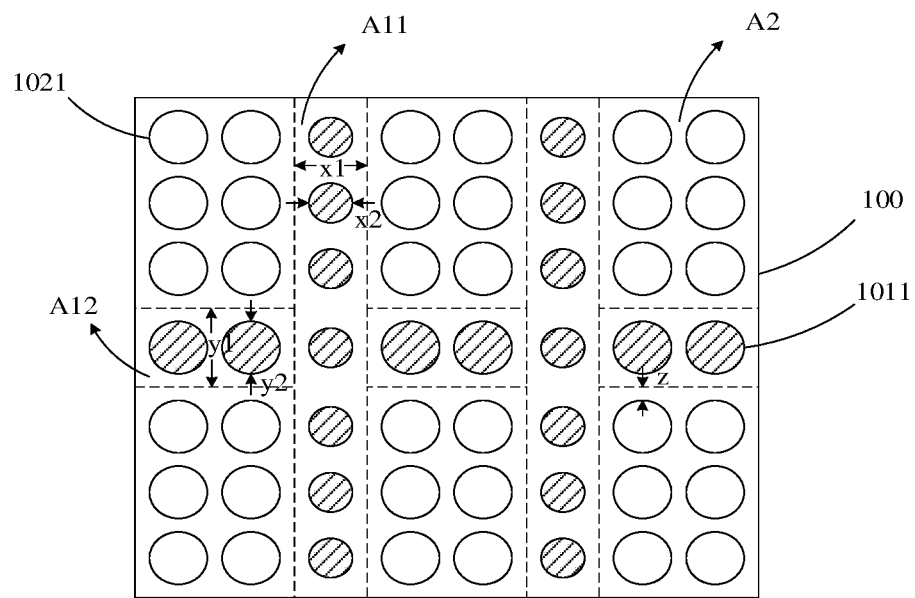
FIG. 5 is a top view of another display panel provided by one embodiment of the present invention.

Next, please refer to FIG. 5, which is a top view of another display panel provided by one embodiment of the present invention. In this embodiment, the plurality of opening regions A2 are arranged in an array manner, the non-opening region A1 includes a first non-opening sub-region A11 and a second non-opening sub-region A12, the first non-opening sub-region A11 is located between adjacent two columns of the opening regions A2, and the second non-opening sub-region A12 is located between adjacent two rows of the opening regions A2. Wherein, in a row direction, a difference between a width x1 of the first non-opening sub-region A11 and a maximum width x2 of the first concave surface 1011 located in the first non-opening sub-region A11 is greater than or equal to 0.5 μm, and less than or equal to 1 μm; and in a column direction, a difference between a width y1 of the second non-opening sub-region A12 and a maximum width y2 of the first concave surface 1011 located in the second non-opening sub-region A12 is greater than or equal to 0.5 μm, and less than or equal to 1 μm.

In one embodiment, in a direction perpendicular to a light-exiting side of the display panel, the maximum width x2 of the first concave surface 1011 located in the first non-opening sub-region A11 is less than the maximum width y2 of the first concave surface 1011 located in the second non-opening sub-region A12.

It should be noted that data lines or power lines are correspondingly disposed between two adjacent columns of the opening regions A2, and a corresponding width therebetween is relatively small; and a thin film transistor circuit is correspondingly disposed between two adjacent rows of the opening regions A2, and a corresponding width therebetween is relatively large. Therefore, in this embodiment, by configuring the maximum width x2 of the first concave surface 1011 located in the first non-opening sub-region A11 to be less than the maximum width y2 of the first concave surface 1011 located in the second non-opening sub-region A12, the width between two adjacent columns of the opening regions A2 can be reduced to improve a resolution of the display panel.

In one embodiment, an interval z between an orthogonal projection of the black matrix layer 200 on the substrate 100 and an adjacent edge of the second concave surface 1021 is greater than or equal to 0.5 μm and less than or equal to 1 μm.

Figure 6A:
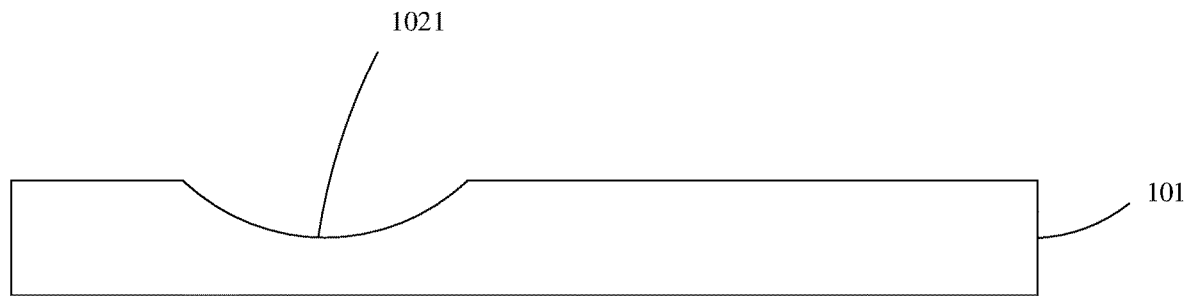
FIG. 6a to FIG. 6g are schematic diagrams of basic structures of each of elements in manufacturing processes of the display panel provided by embodiments of the present invention.

Next, please refer to FIG. 6a to FIG. 6g, which are schematic diagrams of basic structures of each of elements in manufacturing processes of the display panel provided by embodiments of the present invention. Firstly, as illustrated in FIG. 6a, the second concave surface 1021 is formed on the first substrate layer 101 (i.e., the glass substrate) through processing steps of exposure, development, and etching, etc., and the second concave surface 1021 is disposed corresponding to the opening region of the display panel. Wherein, in a direction of the light-emitting side of the display panel, the sectional shape of the second concave surface 1021 is preferably circular arc, or can be trapezoidal, and a depth of the second concave surface 1021 ranges from 0.2 μm to 2 μm; and on a plane perpendicular to the light-emitting side of the display panel, an orthographic projection shape of the second concave surface 1021 is a circle or a quadrilateral.

Figure 6B:
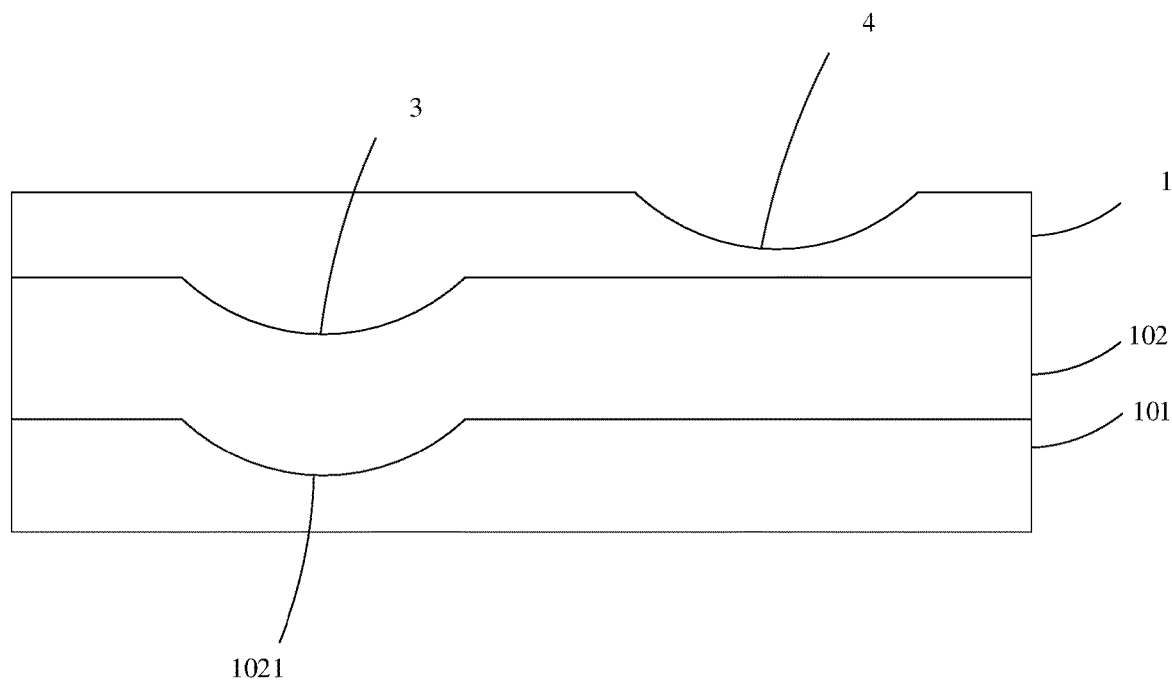

Next, as illustrated in FIG. 6b, the second substrate layer 102 (i.e., the silicon nitride film) is deposited on the first substrate layer 101, and a first concave structure 3 is formed at a position corresponding to the second concave surface 1021 on the second substrate layer 102. Then, a photoresist is coated on the second substrate layer 102, and the photoresist is exposed and developed to form a first photoresist layer 1 and a second concave structure 4 located on an upper surface of the first photoresist layer 1. The second concave structure 4 is located in the non-opening region of the display panel.

Figure 6C:
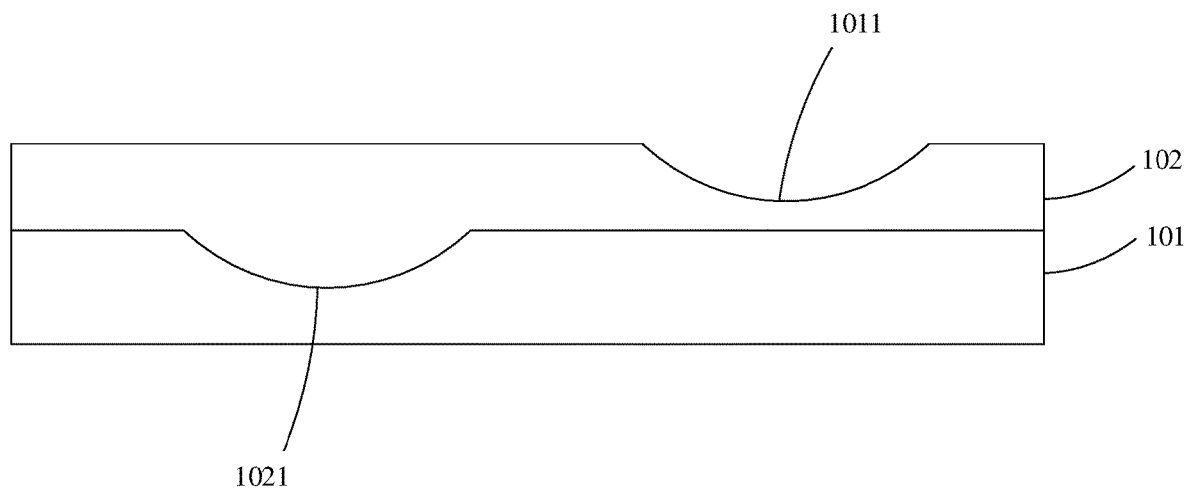

Next, as illustrated in FIG. 6c, an entire surface of elements in FIG. 6b are dry-etched, and etching rates of the first photoresist layer 1 and the second substrate layer 102 are kept consistent. Finally, the surface of the second substrate layer 102 corresponding to the opening region being flat is achieved (i.e., the etching depth being below to the bottom end of the first concave structure 3), and the first concave surface 1011 (corresponding to the second concave structure 4) is formed on the surface of the second substrate layer 102 corresponding to the non-opening region. Wherein, in the direction of the light-emitting side of the display panel, the sectional shape of the first concave surface 1011 is preferably circular arc, or can be trapezoidal, and a depth of the first concave surface 1011 ranges from 0.2 μm to 2 μm; and on a plane perpendicular to the light-emitting side of the display panel, an orthographic projection shape of the first concave surface 1011 is a circle or a quadrilateral.

Figure 6D:
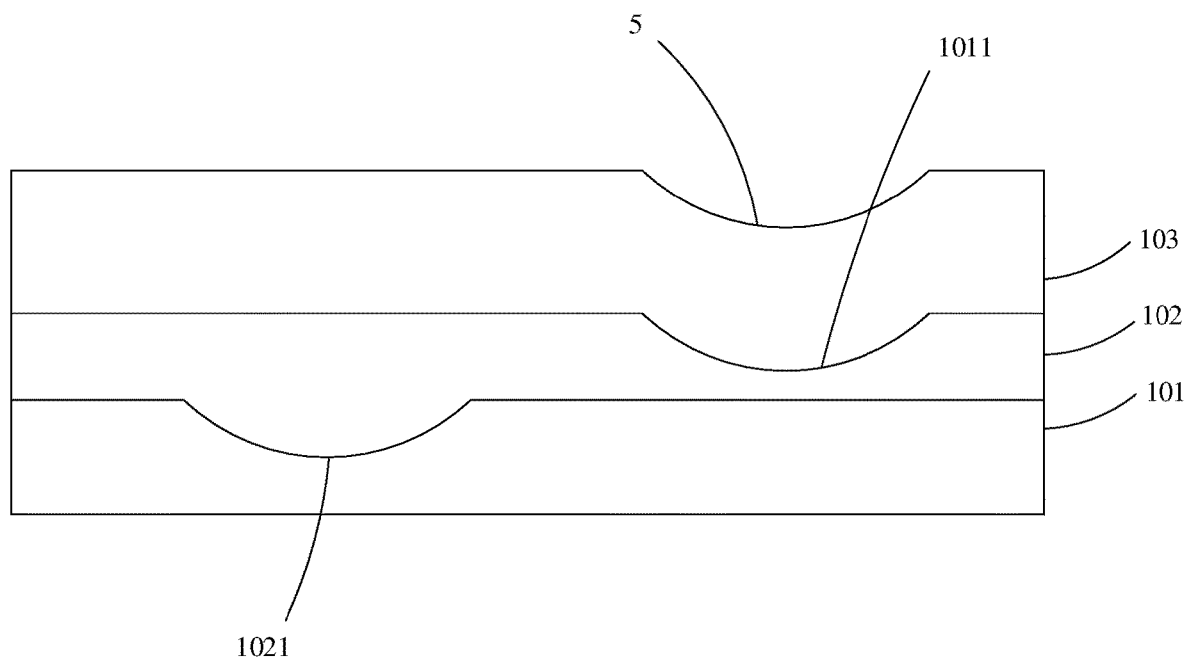

Next, as illustrated in FIG. 6d, the third substrate layer 103 (i.e., the silicon oxide film) is deposited on the second substrate layer 102, and a third concave structure 5 is formed on the third substrate layer 103 corresponding to the first concave surface 1011.

Figure 6E:
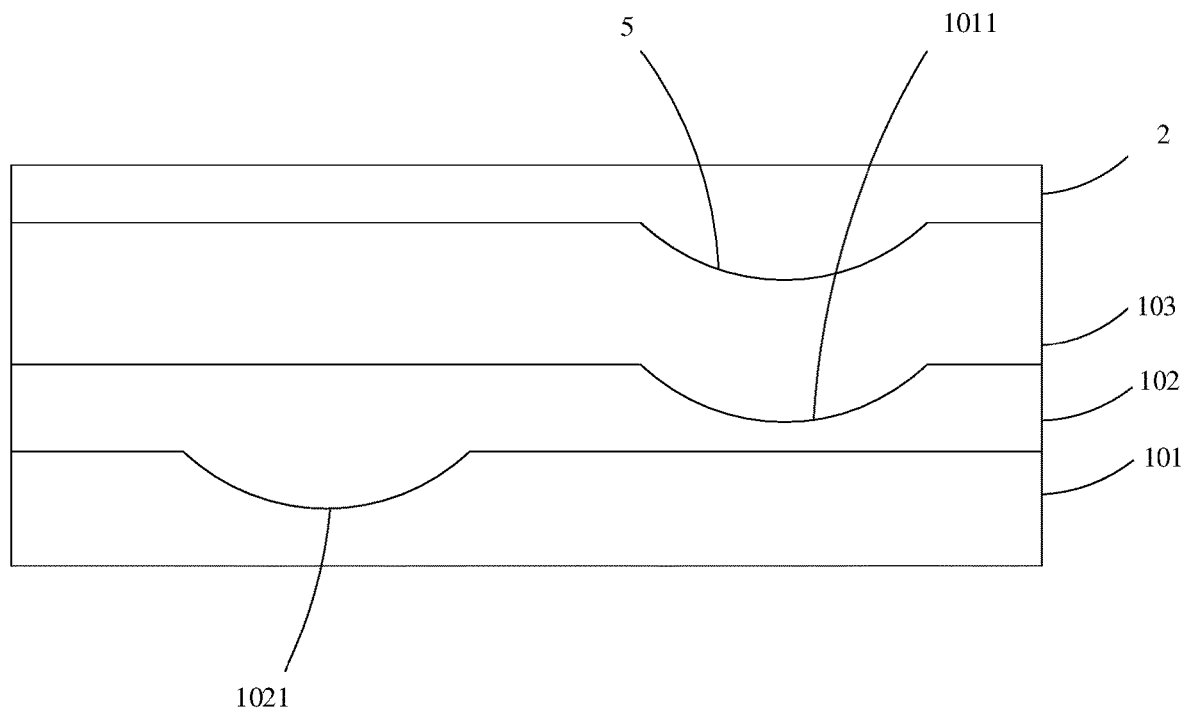

Next, as illustrated in FIG. 6e, a photoresist is coated on the third substrate layer 103 to form the second photoresist layer 2, so that an upper surface of the third substrate layer 103 is flat.

Figure 6F:
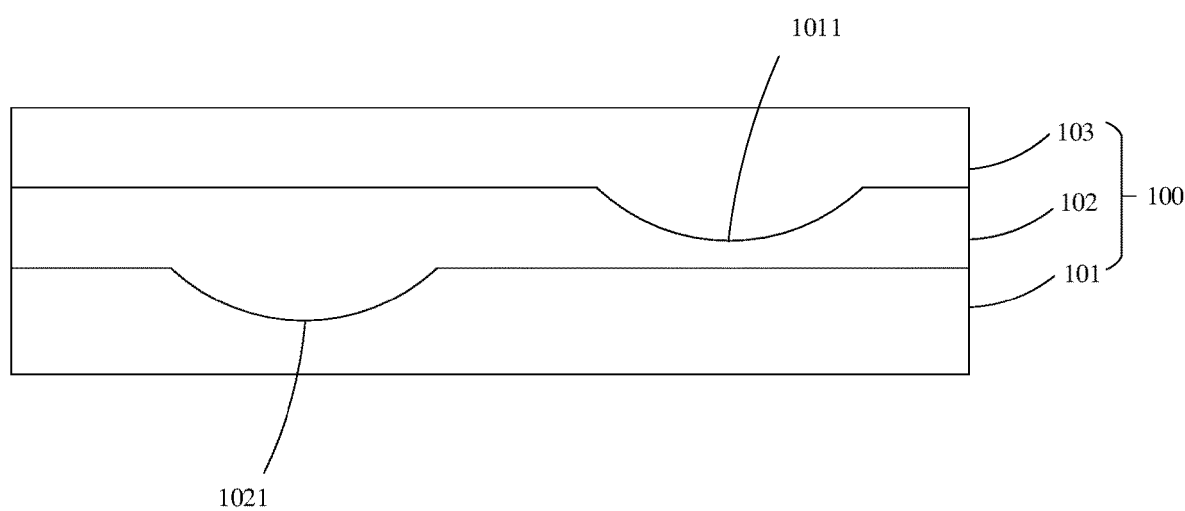

Next, as illustrated in FIG. 6f, an entire surface of elements in FIG. 6e are dry-etched, etching rates of the second photoresist layer 2 and the third substrate layer 103 are kept consistent. Finally, a purpose of the upper surface of the third substrate layer 103 being flat is achieved (i.e., the etching depth being below to the bottom end of the third concave structure 5), and the substrate 100 is formed.

Figure 6G:
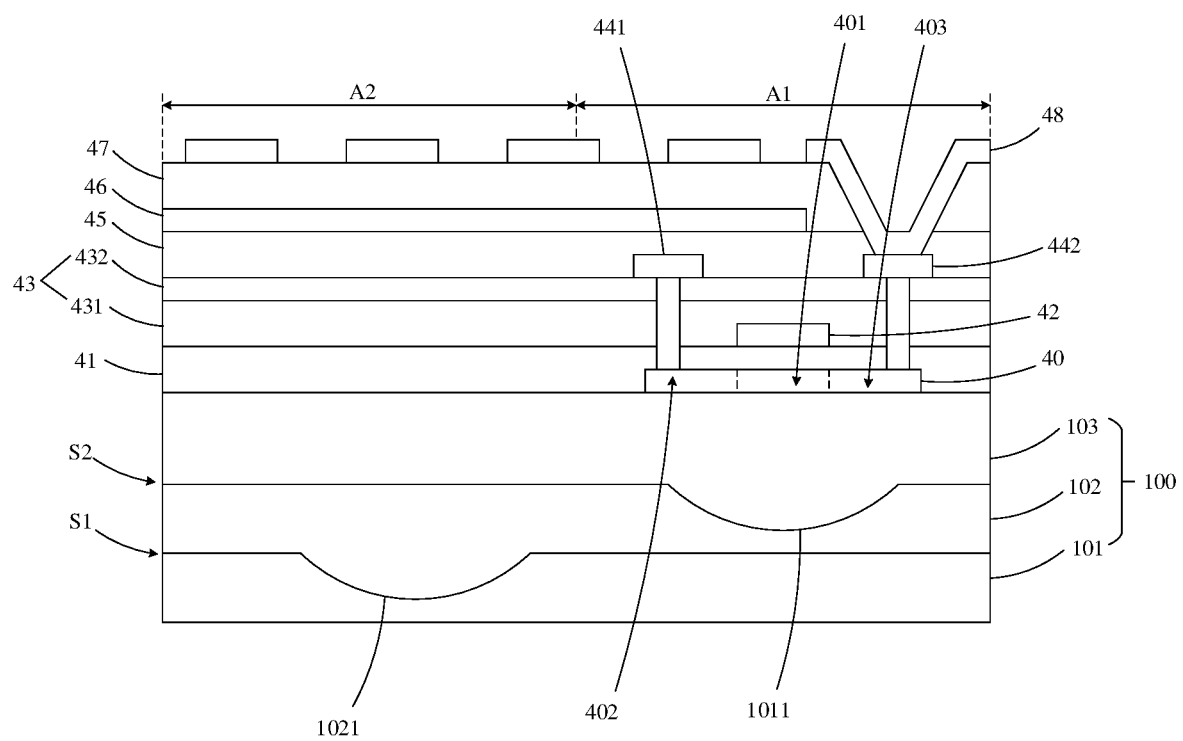

Next, as illustrated in FIG. 6g, manufacturing other film layers of the array substrate is performed on the substrate 100, and the manufacturing method thereof is a conventional technology, which is not described in detail herein.

It should be noted that in FIG. 6g, manufacture of other film layers is performed on a side of the silicon oxide layer away from the silicon nitride layer. This embodiment can simultaneously multiplex the silicon nitride layer and the silicon oxide layer to be a buffer layer and a barrier layer, so no additional thickness of the display panel is added. In another embodiment, the manufacture of the other film layers can also be performed on a side of the silicon nitride layer away from the glass substrate, as illustrated in FIG. 4. The beneficial effect of this embodiment is that: after the light is refracted by the first concave surface 1011, the light passes through the glass substrate with a large thickness, so before the light reaches other film layers, there is enough distance to change the propagation direction, thereby making the light efficiency to be higher; and additionally, flatness of the glass substrate is relatively good, which can also prevent influence of surface unevenness of the upper surface of the first concave surface 1011 on electrical properties of the active layer 40.

Next, please refer to FIG. 7, which is a schematic diagram of a basic structure of a display device provided by one embodiment of the present invention. The display device includes a backlight module 300 and a display panel. The display panel is located on a light-exiting side of the backlight module 300. The basic structure and manufacturing processes of the display panel please refer to FIG. 1 to FIG. 6g and related descriptions, and redundant description will not be mentioned herein again. The display device in the embodiments of the present invention can be products or components having display functions, such as a mobile phone, a tablet PC, a laptop, a television, a digital camera, a pilot director, etc.

The display panel and the display device thereof provided by the embodiments of the present invention are described in detail above. It should be understood that, the exemplary embodiments described herein should be considered in descriptive, and is used for understanding the method of the present disclosure and its main idea, and is not intended to limit the present disclosure.

What is claimed is:

1. A display panel, comprising a non-opening region and a plurality of opening regions, wherein the non-opening region is located between adjacent opening regions, the display panel comprises a substrate, the substrate is located on a side of the display panel away from a light-exiting surface; wherein the substrate comprises:
    a first base layer;
    a second base layer located on the first base layer, wherein a first interface is formed between the second base layer and the first base layer, and a refractive index of the second base layer is greater than a refractive index of the first base layer; and
    a third base layer located on the second base layer, wherein a second interface is formed between the third base layer and the second base layer, and a refractive index of the third base layer is less than the refractive index of the second base layer;
    wherein at least one of the first interface or the second interface forms a first concave surface in the non-opening region, and a concave direction of the first concave surface is toward a side with a larger refractive index in two sides of the first concave surface; and
    wherein at least other one of the first interface or the second interface forms a second concave surface in the plurality of opening regions, and a concave direction of the second concave surface is toward a side with a smaller refractive index in two sides of the second concave surface.

2. The display panel as claimed in claim 1, wherein the display panel comprises an active layer located in the non-opening region, the active layer is located on the substrate, and the active layer comprises a channel region, and a source contact region and a drain contact region respectively located on two sides of the channel region; and
    wherein an orthogonal projection of the channel region on the substrate is located in the first concave surface.

3. The display panel as claimed in claim 2, wherein the display panel comprises a light-shielding layer, the light-shielding layer is located between the first base layer and the active layer; and
    wherein an orthogonal projection of the channel region on the light-shielding layer is located on the light-shielding layer, and an orthogonal projection of the light-shielding layer on the substrate is located in the first concave surface.

4. The display panel as claimed in claim 3, wherein the first base layer is a glass substrate, the second base layer is a silicon nitride layer, and the third base layer is a silicon oxide layer; and
    wherein the active layer is located on a surface of a side of the silicon oxide layer away from the silicon nitride layer, and the light-shielding layer is located on a surface of a side of the glass substrate close to the active layer.

5. The display panel as claimed in claim 4, wherein a thickness of the silicon oxide layer is greater than a thickness of the silicon nitride in a direction of a light-exiting side of the display panel.

6. The display panel as claimed in claim 3, wherein the first base layer is a silicon oxide layer, the second base layer is a silicon nitride layer, and the third base layer is a glass substrate;
    wherein a barrier layer is disposed between the glass substrate and the active layer, and the light-shielding layer is located on a surface of a side of the glass substrate close to the active layer.

7. The display panel as claimed in claim 1, wherein sectional shapes of the first concave surface and the second concave surface are circular arc or trapezoidal in a direction of a light-exiting side of the display panel.

8. The display panel as claimed in claim 7, wherein in the direction of the light-exiting side of the display panel, heights of the first concave surface and the second concave surface are greater than or equal to 0.2 μm, and less than or equal to 2 μm; and in a direction perpendicular to the light-exiting side of the display panel, maximum widths of the first concave surface and the second concave surface are greater than or equal to 5 μm, and less than or equal to 20 μm.

9. The display panel as claimed in claim 1, wherein the display panel comprises a black matrix layer, the black matrix layer is located on the substrate, and the black matrix layer completely overlaps with the non-opening region.

10. The display panel as claimed in claim 9, wherein the plurality of opening regions are arranged in an array manner, the non-opening region comprises a first non-opening sub-region and a second non-opening sub-region, the first non-opening sub-region is located between adjacent two columns of the plurality of opening regions, and the second non-opening sub-region is located between adjacent two rows of the plurality of opening regions; and
    wherein in a row direction, a difference between a width of the first non-opening sub-region and a maximum width of the first concave surface located in the first non-opening sub-region is greater than or equal to 0.5 μm, and less than or equal to 1 μm; and in a column direction, a difference between a width of the second non-opening sub-region and a maximum width of the first concave surface located in the second non-opening sub-region is greater than or equal to 0.5 μm, and less than or equal to 1 μm.

11. The display panel as claimed in claim 10, wherein in a direction perpendicular to a light-exiting side of the display panel, the maximum width of the first concave surface located in the first non-opening sub-region is less than the maximum width of the first concave surface located in the second non-opening sub-region.

12. The display panel as claimed in claim 9, wherein an interval between an orthogonal projection of the black matrix layer on the substrate and an adjacent edge of the second concave surface is greater than or equal to 0.5 μm and less than or equal to 1 μm.

13. A display device, comprising a backlight module and a display panel, wherein the display panel is located on a light-exiting side of the backlight module, the display panel comprises a non-opening region and a plurality of opening regions, wherein the non-opening region is located between adjacent opening regions, the display panel comprises a substrate, the substrate is located on a side of the display panel away from a light-exiting surface; wherein the substrate comprises:
- a first base layer;
- a second base layer located on the first base layer, wherein a first interface is formed between the second base layer and the first base layer, and a refractive index of the second base layer is greater than a refractive index of the first base layer; and
- a third base layer located on the second base layer, wherein a second interface is formed between the third base layer and the second base layer, and a refractive index of the third base layer is less than the refractive index of the second base layer;
- wherein at least one of the first interface or the second interface forms a first concave surface in the non-opening region, and a concave direction of the first concave surface is toward a side with a larger refractive index in two sides of the first concave surface; and
- wherein at least other one of the first interface or the second interface forms a second concave surface in the plurality of opening regions, and a concave direction of the second concave surface is toward a side with a smaller refractive index in two sides of the second concave surface.

14. The display device as claimed in claim 13, wherein the display panel comprises an active layer located in the non-opening region, the active layer is located on the substrate, and the active layer comprises a channel region, and a source contact region and a drain contact region respectively located on two sides of the channel region; and
- wherein an orthogonal projection of the channel region on the substrate is located in the first concave surface.

15. The display device as claimed in claim 14, wherein the display panel comprises a light-shielding layer, the light-shielding layer is located between the first base layer and the active layer; and
- wherein an orthogonal projection of the channel region on the light-shielding layer is located on the light-shielding layer, and an orthogonal projection of the light-shielding layer on the substrate is located in the first concave surface.

16. The display device as claimed in claim 15, wherein the first base layer is a glass substrate, the second base layer is a silicon nitride layer, and the third base layer is a silicon oxide layer; and
- wherein the active layer is located on a surface of a side of the silicon oxide layer away from the silicon nitride layer, and the light-shielding layer is located on a surface of a side of the glass substrate close to the active layer.

17. The display device as claimed in claim 13, wherein sectional shapes of the first concave surface and the second concave surface are circular arc or trapezoidal in a direction of a light-exiting side of the display panel.

18. The display device as claimed in claim 17, wherein in the direction of the light-exiting side of the display panel, heights of the first concave surface and the second concave surface are greater than or equal to 0.2 μm, and less than or equal to 2 μm; and in a direction perpendicular to the light-exiting side of the display panel, maximum widths of the first concave surface and the second concave surface are greater than or equal to 5 μm, and less than or equal to 20 μm.

* * * * *